US006972971B2

(12) United States Patent
Jang et al.

(10) Patent No.: US 6,972,971 B2
(45) Date of Patent: Dec. 6, 2005

(54) PULSE WIDTH MODULATION SIGNAL GENERATOR AND SWITCHING MODE POWER SUPPLY INCLUDING THE SAME

(75) Inventors: Kyung-Oun Jang, Incheon (KR); Eung-Suen Kim, Incheon (KR)

(73) Assignee: Fairchild Korea Semiconductor Ltd., Kyungki-do (KR)

( * ) Notice: Subject to any disclaimer, the term of this patent is extended or adjusted under 35 U.S.C. 154(b) by 0 days.

(21) Appl. No.: 10/698,056

(22) Filed: Oct. 29, 2003

(65) Prior Publication Data

US 2004/0145924 A1 Jul. 29, 2004

(30) Foreign Application Priority Data

Oct. 29, 2002 (KR) .................. 10-2002-0066133

(51) Int. Cl.[7] .............................................. H02M 7/22
(52) U.S. Cl. ..................................... 363/49; 363/56.11
(58) Field of Search .............................. 363/49, 56.11, 363/21.01, 131, 21.1, 21.18

(56) References Cited

U.S. PATENT DOCUMENTS

| | | | |
|---|---|---|---|
| 5,014,178 A | | 5/1991 | Balakrishnan |
| 5,285,369 A | | 2/1994 | Balakrishnan |
| 5,982,640 A | * | 11/1999 | Naveed et al. ............ 363/21.15 |
| 5,995,384 A | * | 11/1999 | Majid et al. .............. 363/21.18 |
| 5,999,429 A | * | 12/1999 | Brown ........................ 363/89 |

* cited by examiner

Primary Examiner—Shawn Riley
(74) Attorney, Agent, or Firm—Townsend and Townsend and Crew LLP (57) ABSTRACT

A switching mode power supply includes a rectifier configured to convert AC power to a first DC power, an output unit configured to convert the first DC power to a second DC power under the control of a first switch, and a pulse width modulation generator coupled to control the first switch. The pulse width modulation generator has a regulator configured to regulate the first DC power. The regulated first DC power powers the pulse width modulation generator. The regulator includes a second switch coupled to control a transmitter so that when the second switch is in a first state the transmitter transmits the first DC power to a capacitor to charge the capacitor to thereby increase the regulated first DC power, and when the switch is in a second state the transmitter does not transmit the first DC power to the capacitor to thereby allow the charge in the capacitor to reduce and in turn the regulated first DC power to reduce.

19 Claims, 6 Drawing Sheets

PULSE WIDTH MODULATION SIGNAL GENERATOR AND SWITCHING MODE POWER SUPPLY INCLUDING THE SAME

CROSS-REFERENCE TO RELATED APPLICATION

This application claims priority to and the benefit of Korea Patent Application No. 2002-66133 filed on Oct. 29, 2002 in the Korean Intellectual Property Office, the content of which is incorporated herein by reference.

BACKGROUND OF THE INVENTION

Figure 1:
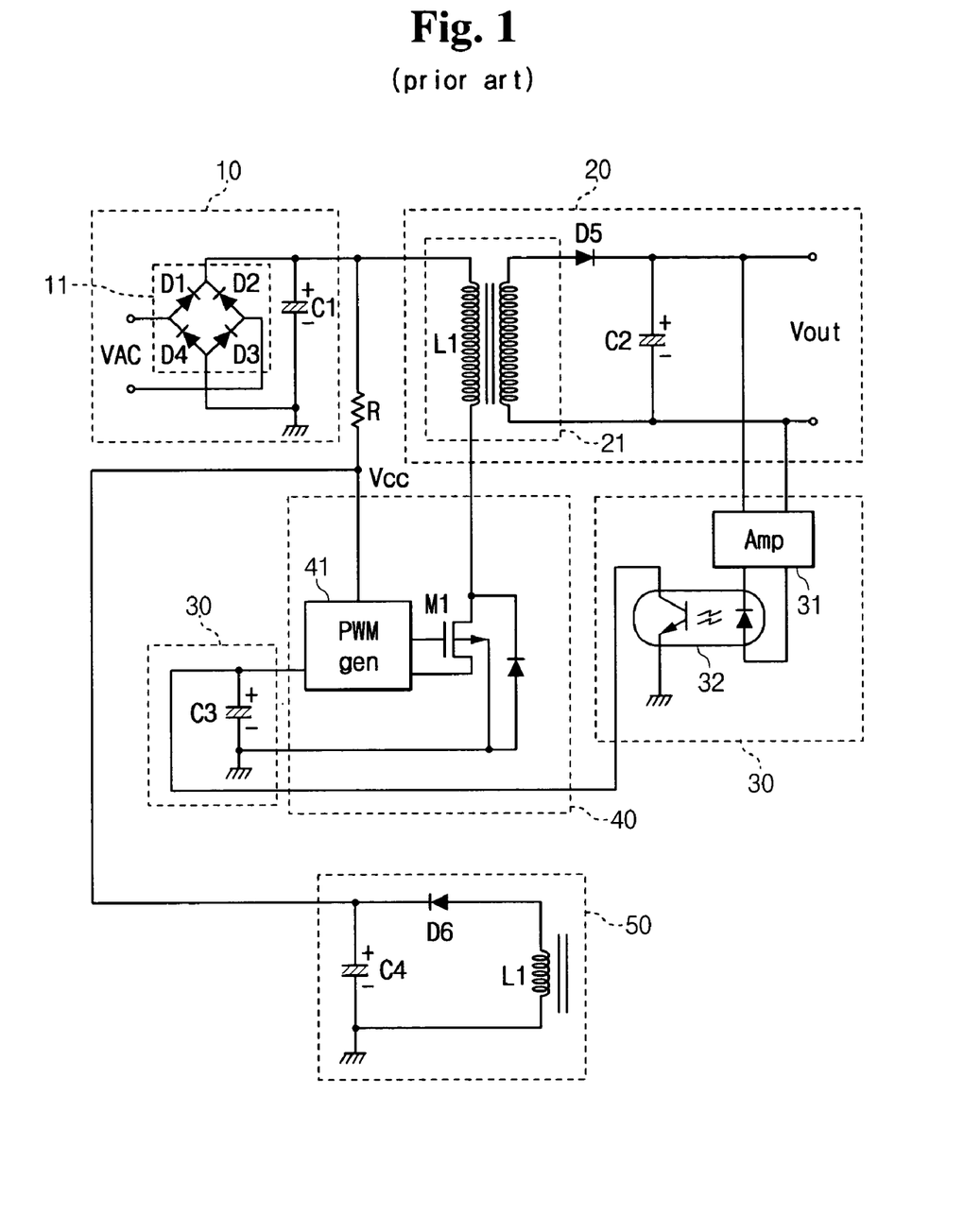
FIG. 1 shows a simplified circuit block diagram of a conventional SMPS.

The present invention relates in general to a switching mode power supply (SMPS), and more particularly to a pulse width modulation (PWM) signal generator for the SMPS. An SMPS supplies a current applied to the primary coil of a transformer to the secondary coil thereof according to on/off operations of a switch coupled to the primary coil of the transformer. FIG. 1 shows a simplified circuit block diagram of a conventional SMPS.

As shown, the SMPS comprises a rectifier 10, a startup resistor R, an output unit 20, a feedback circuit 30, a switching driver 40, and a power source unit 50. Rectifier 10 comprises a bridge diode rectifier 11 and a capacitor C1. Output unit 20 comprises a transformer 21, a diode D5, and a capacitor C2. Feedback circuit 30 comprises an amplifier 31, a photo coupler 32, and a capacitor C3. Switching driver 40 comprises a PWM generator 41 and a switch M1. Power source unit 50 comprises a capacitor C4, an auxiliary winding L1 of transformer 21, and a diode D6.

At the initial driving of the SMPS, switch M1 is off. A smoothed DC current generated by rectifier 10 thus does not flow to the primary coil of transformer 21 but instead flows through startup resistor R. Since PWM generator 41 does not start operating until power supply voltage Vcc reaches a predetermined value, the current flowing through resistor R does not initially flow to PWM generator 41 and instead flows to power source unit 50 to charge capacitor C4. When capacitor C4 is charged to a potential Vcc, PWM generator 41 starts to operate.

Once PWM generator 41 starts operating, it outputs pulses having a predetermined duty cycle to a gate of switch M1. Switch M1 then turns on and off in response the pulses. When switch M1 is turned on, the smoothed DC power supplied by rectifier 10 flows to the primary coil of transformer 21 to charge the current in the primary coil. When switch M1 is turned off, the smoothed DC power does not flow to the primary coil, and the stored current in the primary coil is transferred to the secondary coil of transformer 21. The current transferred to the secondary coil is rectified to a positive current by diode D5 and then smoothed by capacitor C2. The smoothed voltage at capacitor C2 represents the output voltage Vout of the SMPS.

The conventional SMPS technique shown in FIG. 1 suffers from a number of drawbacks. First, once PWM generator 41 starts operating, the current flowing through startup resistor R is no longer needed because power source 50 supplies the necessary power to PWM generator 41. Thus, the current flowing through resistor R after PWM generator 41 starts operating results in wasted power consumption. Second, production cost increases because startup resistor R is required. Third, since power source unit 50 for supplying power to PWM generator 41 is required after PWM generator 41 starts operating, external elements such as diode D6 and auxiliary winding L1 are used, and accordingly, the total power consumption by the system further increases.

BRIEF SUMMARY OF THE INVENTION

In accordance with an embodiment of the invention, a switching mode power supply includes a rectifier configured to convert AC power to a first DC power, an output unit configured to convert the first DC power to a second DC power under the control of a first switch, and a pulse width modulation generator coupled to control the first switch. The pulse width modulation generator has a regulator configured to regulate the first DC power. The regulated first DC power powers the pulse width modulation generator. The regulator includes a second switch coupled to control a transmitter so that when the second switch is in a first state the transmitter transmits the first DC power to a capacitor to charge the capacitor, and when the switch is in a second state the transmitter does not transmit the first DC power to the capacitor to thereby allow the charge in the capacitor to reduce.

In one embodiment, the regulator further includes a power supply voltage manager configured to bias the second switch so that during normal mode of operation the regulated first DC power is maintained at a substantially constant voltage level.

In another embodiment, the regulator further includes a switch core coupled between the power supply voltage manager and the second switch so that during a power up mode the switch core biases the second switch in the first state until the regulated first DC power reaches a predetermined power level, and during the normal mode of operation the switch core couples an output of the power supply voltage manager to the second switch.

In another embodiment, the power supply voltage manager includes a comparator configured to compare a first voltage derived from the regulated first DC power to a reference voltage and in response output a signal for biasing the second switch such that the regulated first DC power is maintained at the substantially constant voltage.

In another embodiment, the regulator is a switched-mode regulator.

The following detailed description and the accompanying drawings provide a better understanding of the nature and advantages of the present invention.

DETAILED DESCRIPTION OF THE INVENTION

Figure 2:
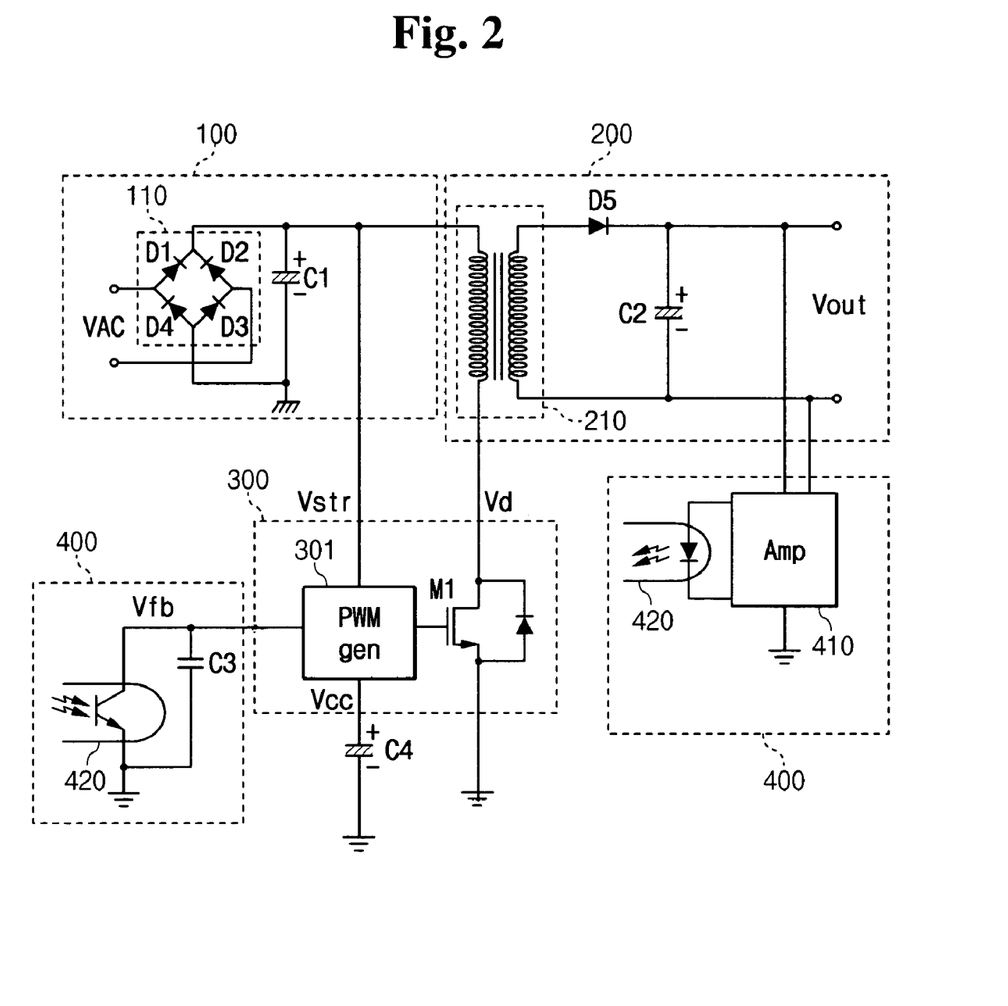
FIG. 2 shows a circuit block diagram of an SMPS according to an embodiment of the present invention.

FIG. 2 is a circuit block diagram of an SMPS according to an embodiment of the present invention. As shown, the SMPS comprises a power supply 100, an output unit 200, a switching driver 300, and a feedback circuit 400.

Rectifier 100 comprises a conventional full-wave bridge rectifier 110 including four diodes D1 through D4, and a smoothing capacitor C1. AC power VAC is supplied across a common node of diodes D1 and D4 and a common node of diodes D2 and D3. Capacitor C1 is coupled across a common node of diodes D1 and D2 and a grounded common node of diodes D3 and D4. AC power VAC undergoes full-wave rectification by full-wave bridge rectifier 110, and then is smoothed by capacitor C1 to be converted to DC power at an output of rectifier 100. The output of rectifier 100 is connected to switching driver 300 and output unit 200.

Switching driver 300 comprises a PWM generator 301 coupled to control a switch M1. PWM generator 301 generates a PWM signal to turn switch M1 on and off. Switch M1 includes a transistor such as a MOSFET. In one embodiment, switching driver 300 is an integrated circuit (IC), and is coupled to an external capacitor C4. Such an IC would have external connection pins Vd, Vstr, Vfb, Vcc, and ground. The voltage stored in capacitor C4 functions as a power supply voltage Vcc for switching driver 300.

Output unit 200 comprises a transformer 210, a diode D5, and a smoothing capacitor C2. The primary coil of transformer 210 is coupled between an output of rectifier 100 and a drain of switch M1. Diode D5 is coupled between the upper terminal of the secondary coil of transformer 210 and capacitor C2. Capacitor C2 is coupled between diode D5 and a lower terminal of the secondary coil. The voltage across capacitor C2 is a DC output voltage Vout.

Feedback circuit 400 comprises an amplifier 410, a photo coupler 420, and a capacitor C3. Amplifier 410 is coupled to receive Vout at its input, and is coupled at its output to an input of photo coupler 420. Capacitor C3 is coupled between an output of photo coupler 420 and the ground. Amplifier 410 amplifies Vout to a voltage level for driving photo coupler 420. When the amplified signal becomes greater than a predetermined value, capacitor C3 is charged to a voltage Vfb. Voltage Vfb operates as a feedback signal to control the duty cycle of the PWM signal generated by switching driver 300.

Figure 3:
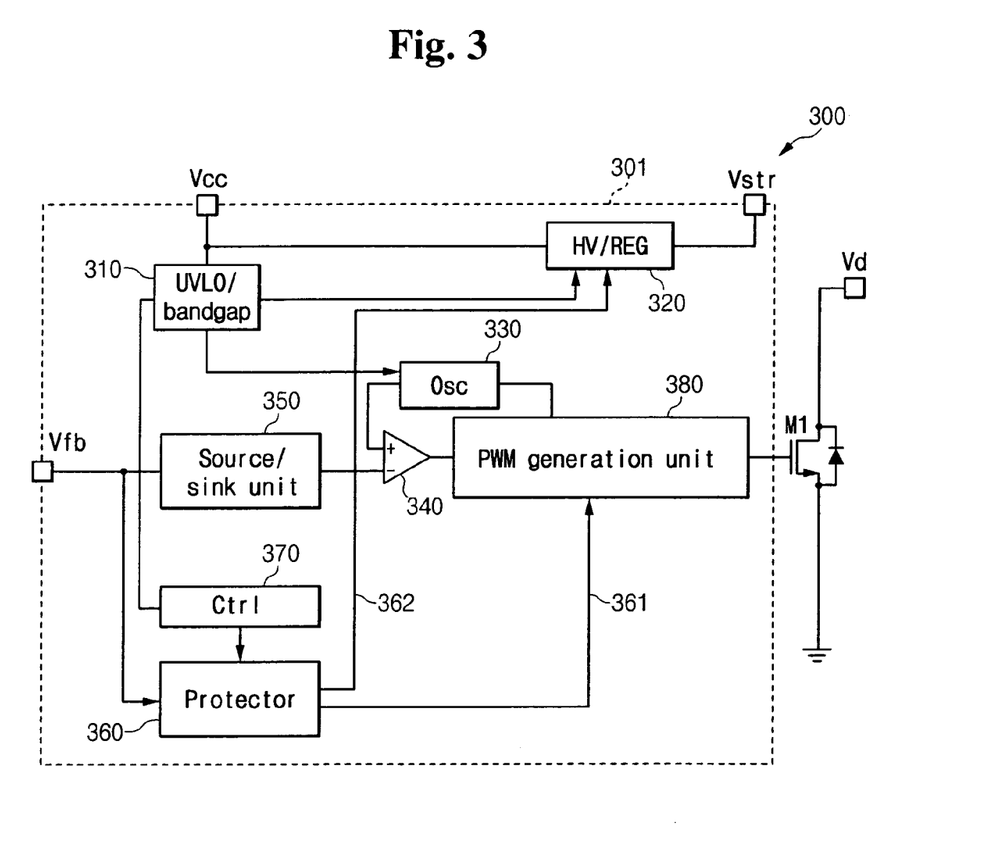
FIG. 3 shows a circuit block diagram of PWM generator 301 in FIG. 2 according to an embodiment of the present invention.

FIG. 3 shows a circuit block diagram of PWM generator 301 in FIG. 2 in accordance with an embodiment of the invention. PWM generator 301 comprises an under-voltage lock-out (UVLO)/bandgap unit 310, a high-voltage regulator (HV/REG) 320, an oscillator 330, a comparator 340, a source/sink unit 350, a protector 360, a controller 370, and a PWM generation unit 380. UVLO/bandgap unit 310 starts to operate when power supply voltage Vcc reaches a predetermined level so as to provide a constant voltage for powering PWM generator 301. HV/REG 320 together with UVLO/bandgap unit 310 operate to sustain power supply voltage Vcc at a constant level. UVLO/bandgap unit 310 is also coupled to cause oscillator 330 to oscillate which in turn causes PWM generation unit 380 to generate a PWM signal of a predetermined frequency and duty cycle applied to the gate of switch M1. Initially, with Vfb at a low level, source/sink unit 350 charges capacitor C3, detects the level of feedback voltage Vfb, and transmits feedback voltage Vfb to comparator 340. Comparator 340 compares the transmitted feedback voltage Vfb with sawtooth waves output by oscillator 330 to control the duty cycle of the PWM signal generated by PWM generation unit 380.

Figure 4:
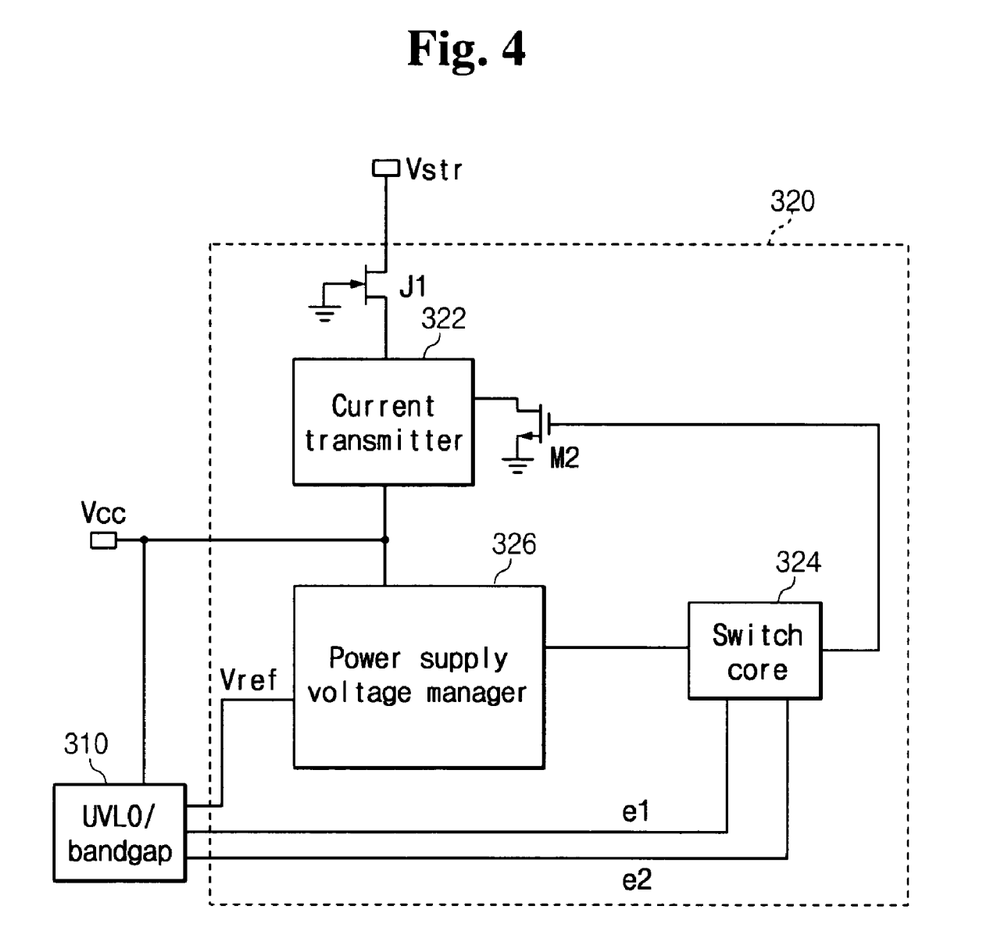
FIG. 4 shows a circuit block diagram of high voltage regulator 320 in FIG. 3 according to an embodiment of the present invention.
Figure 5:
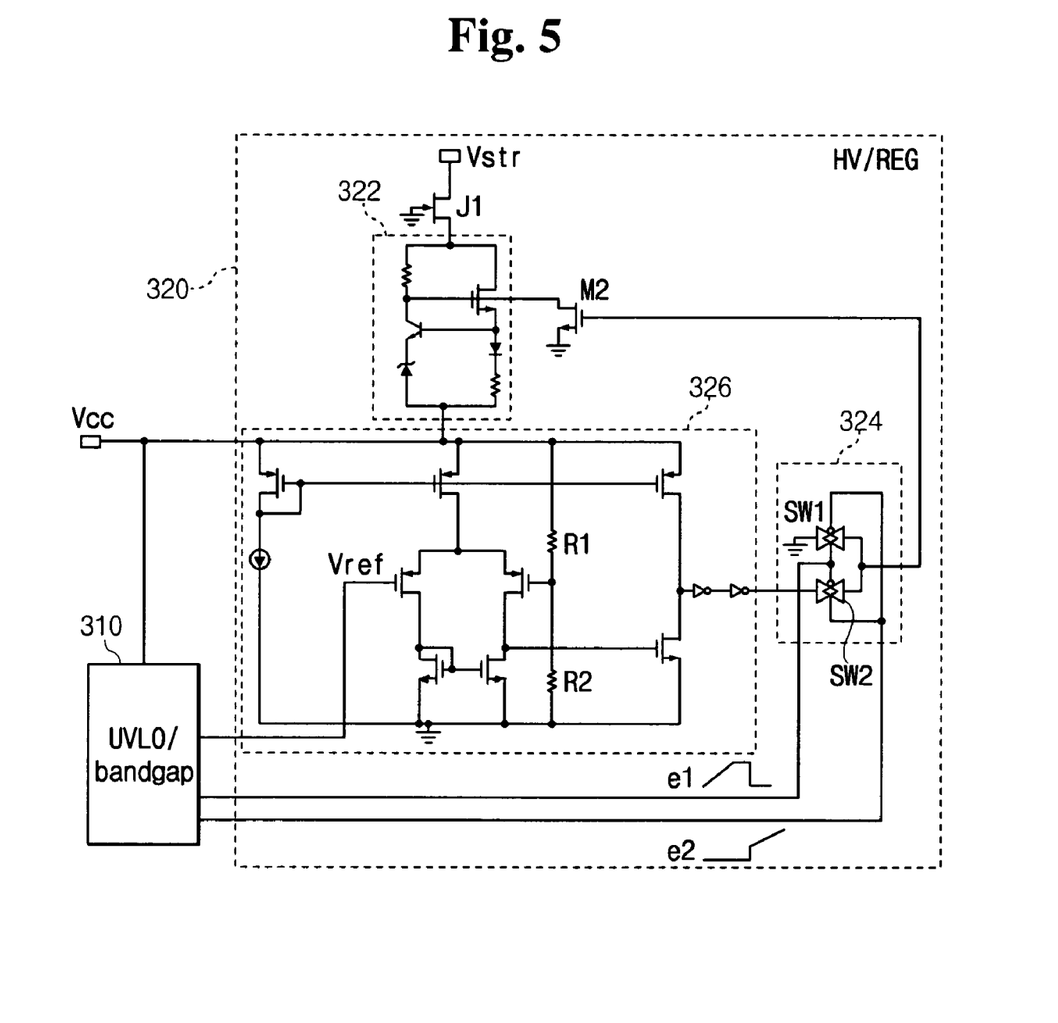
FIG. 5 shows a circuit implementation of high voltage regulator 320 in FIG. 4 according to an embodiment of the present invention.

Protector 360 and controller 370 operate to protect switch M1 and other circuitry when: (i) output voltage Vout of output unit 200 is overloaded, or (ii) power supply voltage Vcc becomes an over-voltage (i.e., Vcc undesirably rises above a predetermined voltage level) or an under-voltage (i.e., Vcc undesirably drops below a predetermined voltage level), or (iii) a thermal reaction (i.e., undesirably high amount of heat dissipation) is detected. Controller 370 includes an automatic restart function for automatic operation when the input power is not turned off. That is, while in normal mode operation, if any of the above three events occurs, switching driver 300 enters the protection mode. While in protection mode, the automatic restart function continuously monitors to determine if the event still persists, and when the event is eliminated, the automatic restart function causes switching driver 300 to resume normal operation. This is describe in more detail further below FIG. 4 shows a circuit block diagram of HV/REG 320 in FIG. 3, and FIG. 5 shows a circuit implementation of HV/REG 320 in FIG. 4, in accordance with embodiments of the invention. There are two types of voltage regulators, linear-mode regulators and switched-mode regulators. Switched-mode regulators dissipate lower power than linear-mode regulators because of their switching action. High voltage regulator 320 in FIGS. 4 and 5 falls in the category of switched-mode regulators. As shown in FIGS. 4 and 5, HV/REG 320 comprises a N-type JFET J 1, a switch M2, a current transmitter 322, a switch core 324, and a power supply voltage manager 326. When switch M2 is off, current transmitter 322 transmits the current at input Vstr to capacitor C4. When switch M2 is on, current transmitter 322 prevents the current at input Vstr from flowing to C4, and the current instead flows to switch M2. Switch core 324, which is shown in FIG. 5 to include transmission gates SW1 and SW2, transmits either a ground potential or the output signal from power supply voltage manager 326 to the gate of switch M2 under the control of two enable signals e1 and e2 having opposite levels. Power supply voltage manager 326 includes a comparator which compares a reference voltage Vref with another voltage derived from Vcc. The voltage derived from Vcc is generated using a voltage divider made up of resistors R1 and R2 serially-connected between Vcc and ground. Power supply voltage manager 326 thus regulates the power supply voltage Vcc using voltage Vref in accordance with the following equation:

$$Vcc = Vref \times [1+(R1/R2)]$$

Reference voltage Vref is provided by a bandgap reference voltage generator in UVLO/bandgap unit 310, and is a constant voltage which is insensitive to temperature variations.

Figure 6:
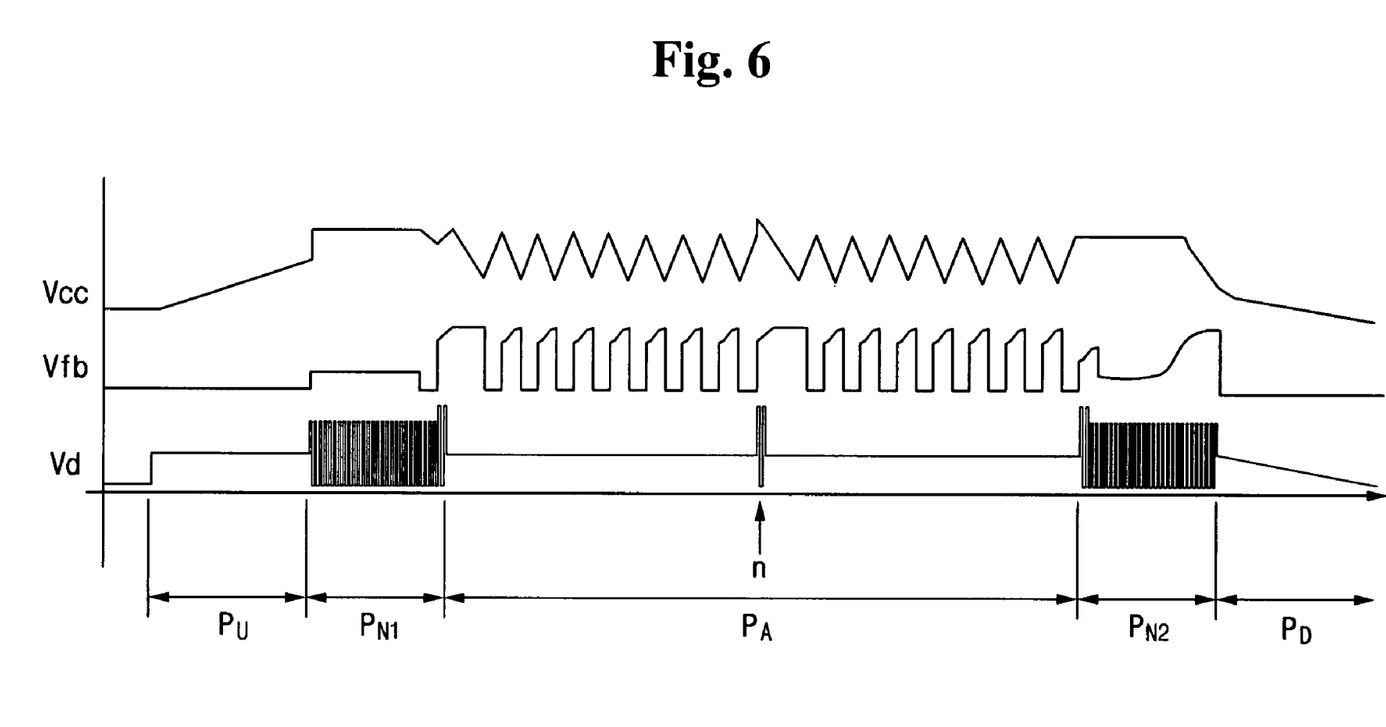
FIG. 6 shows a timing diagram of the SMPS in FIG. 2.

The operation of switching driver 300 (FIG. 2) will be described next using the timing diagram in FIG. 6 in conjunction with FIGS. 2–5. In FIG. 6, time period $P_U$ represents the power-up mode, time periods $P_{N1}$ and $P_{N2}$ represent normal operating modes, time period $P_A$ represents protection mode, and time period $P_D$ represents the power-down mode.

Initially, since capacitor C4 is not yet charged, power supply voltage Vcc is approximately 0V. When AC power is applied to the VAC input of rectifier 100, the AC power is rectified by full-wave bridge rectifier 110, smoothed by capacitor C1, and transformed to DC power. The DC power at Vstr is applied to HV/REG 320.

Transistor M2 (FIG. 5) is initially off because the gate of transistor M2 is coupled to the ground potential through transmission gate SW1 of switch core 324. With transistor M2 turned off, JFET J1 is turned on. The DC power at Vstr is thus transferred to capacitor C4 through JFET J1 and current transmitter 322 to thereby increase power supply voltage Vcc. This is shown in FIG. 6 as the power-up mode period $P_U$. JFET J1 also functions to convert the current level at Vstr to a lower level as required by HV/REG 320. When power supply voltage Vcc reaches a predetermined level, UVLO/bandgap unit 310 starts operating and generates a low enable signal e1 and a high enable signal e2. Transmission gate SW1 is thus turned off and transmission gate SW2 is turned on. Accordingly, the output of power supply voltage manager 326 is coupled to the gate of switch M2 through transmission gate SW2. During the time that the output of power supply voltage manager 326 controls the gate of switch M2, power supply voltage manager 326 functions to maintain power supply voltage Vcc at a constant voltage.

As described above, UVLO/bandgap unit 310 controls PWM generator 301 to prevent PWM generator 301 from operating until Vcc reaches a predetermined voltage. At the beginning of normal mode $P_{N1}$, when Vcc has reached the predetermined voltage, UVLO/bandgap unit 310 starts operating to apply the constant voltage to PWM generator 301, and oscillator 330 accordingly starts to operate. PWM generation unit 380 generates the PWM signal having a constant duty cycle, and switch M1 is turned on and off in accordance with the PWM signal. Therefore, voltage Vd at the drain of switch M1 has a pulse form during the $P_{N1}$ period, as shown in FIG. 6.

Referring to FIG. 2, when switch M1 is turned on, the DC current supplied by rectifier 100 flows to the primary coil of transformer 210 to store energy in the primary coil. When switch M1 is turned off, the current supplied by rectifier 100 no longer flows to the primary coil of transformer 210, and accordingly, the energy stored in the primary coil is transmitted to the secondary coil of transformer 210. Therefore, when the turn-on time of switch M1 lengthens, the energy stored in the primary coil of transformer 210 increases, which in turn increases the energy transmitted to the secondary coil. That is, when the duty cycle of the PWM signal generated by PWM generation unit 380 (FIG. 3) increases, the energy transmitted to the secondary coil of transformer 210 increases accordingly. Conversely, when the duty cycle of the PWM signal decreases, the energy transmitted to the secondary coil decreases accordingly. The energy transmitted to the secondary coil of transformer 210 is rectified by diode D5, smoothed by capacitor C2, and output as output voltage Vout.

Amplifier 410 of feedback controller 400 receives output voltage Vout of output unit 200 and outputs a signal for driving photo coupler 420. When Vout received by amplifier 410 is greater than a predetermined level, the collector current in photo-coupler 420 increases, and thus feedback voltage Vfb reduces. Conversely, when Vout is less than a predetermined level, the collector current in photo-coupler 420 decreases, and a current source in source/sink unit 350 supplies current to C3 to thereby increase feedback voltage Vfb. The level of feedback voltage Vfb is detected and input to comparator 340 by source/sink unit 350. Comparator 340 compares the signal at the output of source/sink unit 350 with the signal at the output of oscillator 330 and outputs a resulting signal to PWM generation unit 380. PWM generation unit 380 adjusts the duty cycle of the PWM signal according to the signal output by comparator 340. For example, PWM generation unit 380 reduces the duty cycle of the PWM signal to reduce the turn-on time of switch M1 when feedback voltage Vfb is high with respect to the output of oscillator 330, and conversely, PWM generation unit 308 increases the duty cycle of the PWM signal to increase the turn-on time of switch M1 when feedback voltage Vfb is low with respect to the output signal of oscillator 330.

If any of the three undesirable events, namely, an overload condition at Vout, an over-voltage or under-voltage condition at Vcc, or an over-temperature condition, occurs, protector 360 detects such event and causes switching driver 300 to enter protection mode $P_A$. In this mode, protector 360 generates an inhibit signal 361 which is coupled to prevent PWM generation unit 380 from generating the PWM signal. Protector 360 also generates another signal 362 coupled to prevent HV/REG 320 from performing its normal Vcc regulation operation. Signal 362 is coupled to a control circuitry (not shown) inside HV/REG 320 such that when signal 362 is in a state corresponding to protection mode, the control circuitry (not shown) overrides the operation of switch core 34 and takes control of transistor M2.

During the protection mode, the control circuitry (not shown) together with UVLO/bandgap 310 operate to cause Vcc to switch between two voltage levels as shown in FIG. 6. That is, initially, upon detecting the undesirable event, the current path between Vstr and Vcc is cut off so that Vcc starts reducing. When Vcc drops below a predetermined level, UVLO/bandgap 310 causes the current path between Vstr and Vcc to be established so that the DC power at Vstr charges capacitor C4 to thereby raise Vcc back up. When Vcc increases above a predetermined level, UVLO/bandgap 310 causes the current path between Vstr and Vcc to be cut off so that Vcc starts reducing. In this manner, Vcc switches between two voltage levels thus forming the sawtooth shape waveform shown in FIG. 6. Controller 370 includes a counter, and is coupled to UVLO/bandgap 310 to keep track of the number of lapsed Vcc cycles. When the number of lapsed Vcc cycles reaches a predetermined count value n, controller 370 generates a signal. This signal is coupled to protector 360 to notify protector 360 that count value n has been reached.

Count value n is stored in controller 370, and is a fixed value (e.g., 8). Count value n signifies an amount of time the protector 360 needs to wait before checking to see if the undesirable event has subsided. That is, after the time period corresponding to count value n has lapsed, protector 360 allows switching driver 300 to operate normally so that PWM generation unit generates the PWM signal. If at this time, the undesirable condition persists, protector 360 detects this and places switching driver 300 back in protection mode. This sequence of operation repeats until protector 360 detects that the undesirable condition has subsided and the SMPS is placed back in normal operating mode.

An example wherein count value n equals 8 is shown in FIG. 6. At the end of normal mode $P_{N1}$ an undesirable event is detected. Protector 360 inhibits PWM generation unit from generating PWM signal, and prevents HV/REG 320 from performing its normal Vcc regulation operation. Thus, as shown in FIG. 6, the pulses at Vd stop, and Vcc starts cycling between two voltage levels as described above. UVLO/bandgap 310 communicates the number of lapsed Vcc cycles to controller 370, and controller 370 in turn compares the number of lapsed Vcc cycles with the fixed count value 8. When the number of lapsed Vcc cycles reaches the count value 8, controller 370 notifies protector 360 that count value 8 has been reached. Protector 360 in turn allows PWM generation unit 380 to operate normally in order to determine whether the undesirable event has subsided. In the example of FIG. 6, at count 8(n), Vfb is shown to be higher than normal indicating that the undesirable condition persists. Detecting this, protector 360 places switching driver 300 back in the protection mode, the counter in controller 370 is reset, and protector 360 waits for another 8 cycles before checking to determine if the undesirable condition still persists. As shown in the FIG. 6 example, the undesirable condition has subsided during the second 8 cycles as evidenced by resumption of normal operating pulses at Vd at the end of the $P_A$ mode. Thus, switching driver 300 starts normal operation as indicated in FIG. 6 by normal mode $P_{N2}$.

In accordance with the present invention, the power consumption attributed to the startup resistor after powering up the SMPS is eliminated since no startup resistor is used. Also, the power supply voltage Vcc is controlled and regulated by using a high-voltage regulator within the switching driver. Therefore, the external auxiliary winding and diode of the power supply in the prior art approach is eliminated. The manufacturing cost is thus reduced. Further, stress and substantial current supply generated during the powering up of the SMPS is prevented.

While the above is a complete description of the preferred embodiments of the invention, various alternatives, modifications, and equivalents may be used. Therefore, the above description should not be taken as limiting the scope of the invention, which is defined by the appended claims.

What is claimed is:

1. A switching mode power supply comprising:
   a rectifier configured to convert AC power to a first DC power;
   an output unit configured to convert the first DC power to a second DC power under the control of a first switch; and
   a pulse width modulation generator coupled to control the first switch, the pulse width modulation generator having a regulator configured to regulate the first DC power, the regulated first DC power powering the pulse width modulation generator, the regulator comprising a second switch coupled to control a transmitter so that when the second switch is in a first state the transmitter transmits the first DC power to a capacitor to charge the capacitor to thereby increase the regulated first DC power, and when the switch is in a second state the transmitter does not transmit the first DC power to the capacitor to thereby allow the charge in the capacitor to reduce and the regulated first DC power to decrease.

2. The switching mode power supply of claim 1 wherein the regulator further comprises a power supply voltage manager configured to bias the second switch so that during normal mode of operation the regulated first DC power is maintained at a substantially constant voltage level.

3. The switching mode power supply of claim 2 wherein the regulator further comprises a switch core coupled between the power supply voltage manager and the second switch so that during a power up mode the switch core biases the second switch in the first state until the regulated first DC power reaches a predetermined power level, and during the normal mode of operation the switch core couples an output of the power supply voltage manager to the second switch.

4. The switching mode power supply of claim 2 wherein the power supply voltage manager comprises a comparator configured to compare a first voltage derived from the regulated first DC power to a reference voltage and in response output a signal for biasing the second switch such that the regulated first DC power is maintained at the substantially constant voltage.

5. The switching mode power supply of claim 2 wherein the regulator is a switched-mode regulator.

6. An SMPS (switching mode power supply) comprising:
   a power supply for converting AC power to DC power and outputting the DC power;
   an output unit including a transformer having a primary coil one end of which is coupled to the power supply, the output unit outputting power transmitted to a secondary coil of the transformer from the power supply;
   a switching driver including a first switch coupled to another end of the primary coil of the transformer, and a first capacitor coupled to store power derived from the DC power, the power stored in the first capacitor powering the switching driver, the switching driver generating a PWM (pulse width modulation) signal for driving the first switch;
   a feedback circuit for feeding back to the switching driver an output signal provided by the output,
   wherein the switching driver comprises:
   a high-voltage regulator for supplying the DC power to the first capacitor when the level of the power stored in the first capacitor is less than a first level, and preventing the DC power from being supplied to the first capacitor when the level of the power stored in the first capacitor is greater than a second level;
   a PWM generation unit for generating the PWM signal; and
   a UVLO (under-voltage lockout)/bandgap unit for starting operation when the power in the first capacitor reaches a predetermined level, and controlling the operation of the PWM generation unit.

7. The SMPS of claim 6, wherein the high-voltage regulator comprises:
   a JFET coupled to the power supply for lowering the level of the DC power; and
   a second switch for controlling a current path between the JFET and the first capacitor in response to an enable signal generated by the UVLO/bandgap unit.

8. The SMPS of claims 6, further comprising:
   an oscillator for generating a clock signal under the control of the UVLO/bandgap unit; and
   a comparator for comparing the feedback signal with the clock signal, wherein the PWM generation unit controls the duty ratio of the PWM signal according to comparison results of the comparator.

9. The SMPS of claim 6, wherein the switching driver further comprises a protector coupled to inhibit the PWM generation unit from generating a PWM signal when one of a number of predetermined events occurs.

10. The SMPS of claim 9, wherein the switching driver further comprises a controller coupled to enable the PWM generation unit to generate the PWM signal a predetermined period of time after the PWM generation unit is inhibited from generating a PWM signal due to occurrence of one of the number of predetermined events.

11. The SMPS of claim 6, wherein the power supply comprises:
    a full-wave bridge rectifier for receiving the AC power and rectifying the same; and
    a second capacitor for smoothing the power rectified by the full-wave bridge rectifier.

12. The SMPS of claim 6, wherein the feedback circuit comprises:
    an amplifier for amplifying the output signal provided by the output unit;

a photo coupler coupled to conduct current in response to the amplified signal provided by the amplifier; and a second capacitor coupled to the photo coupler such that the current conduction in the photo coupler impacts the charge stored in the second capacitor.

13. An SMPS (switching mode power supply) comprising:
a transformer for receiving a DC power at one end of a primary coil, and outputting power through a secondary coil; and a switching driver including a transistor coupled between another end of the primary coil and a reference voltage, for generating a PWM (pulse width modulation) signal for periodically turning on/off the transistor and operating the transformer by the on/off operation of the transistor, wherein the switching driver comprises:
a capacitor coupled to store power derived from the DC power, the power stored in the first capacitor powering the switching driver;

a UVLO (under-voltage lockout)/bandgap unit for starting operation when the power in the capacitor reaches a predetermined level;

a high-voltage regulator including: a switch configured to couple the power derived from the DC power to the capacitor when the power stored in the capacitor is less than a first level, and to decouple the power derived from the DC power from the capacitor when the power stored in the capacitor is greater than a second level; and a switch core for controlling the switch according to an enable signal supplied by the UVLO/bandgap unit;

an oscillator for generating a clock signal under the control of the UVLO/bandgap unit; and a PWM generation unit for generating a PWM signal according to the clock signal.

14. The SMPS of claim 13, further comprising a feedback circuit for providing a feedback signal to the switching driver in response to an output signal provided by the transformer, wherein
the PWM generation unit controls the duty ratio of the PWM signal according to the feedback signal.

15. The SMPS of claim 14, further comprising:
a protector coupled to inhibit the PWM generation unit from generating a PWM signal to thereby turn off the transistor when one of a number of predetermined events occurs; and a controller coupled to periodically enable the PWM generation unit to generate a PWM signal after the PWM generation is inhibited from generation of a PWM signal in order to determine whether the one of a number of predetermined events still persists.

16. A PWM (pulse width modulation) signal generator including a transistor coupled between a primary coil of a transformer and a reference voltage, for supplying a PWM signal to a gate of the transistor to periodically turn on/off the transistor and thus operate the transformer, comprising:
a high-voltage regulator including a JFET coupled to lower a level of a DC power;

a capacitor coupled to store power corresponding to the lowered DC power, a UVLO (under-voltage lockout)/bandgap unit for starting operation when the power in the capacitor reaches a predetermined level;

an oscillator for generating a clock signal under the control of the UVLO/bandgap unit; and a PWM generation unit for generating the PWM signal according to the clock, wherein
the high-voltage regulator supplies the lowered DC power to the capacitor when the level of the power stored in the capacitor is less than a first level, and preventing the lowered DC power from being supplied to the capacitor when the level of the power stored in the capacitor is greater than a second level.

17. The PWM signal generator of claim 16, wherein the high-voltage regulator further comprises:
a power supply voltage manager for regulating the power stored in the capacitor;

a switch core for transmitting a control signal from the power supply manager to a switch under the control of the UVLO/bandgap unit, the a switch being tuned on/off according to the control signal; and a current transmitter for coupling the JFET to the capacitor when the switch is turned off, and decoupling the JFET from the capacitor when the switch is turned off.

18. The PWM signal generator of claim 16, comprising:
a source/sink unit for receiving a feedback signal derived from an output signal output by the transformer; and a comparator for comparing an output of the source/sink unit with an output of the oscillator, wherein
the PWM generation unit controls the duty ratio of the PWM signal according to a comparison result of the comparator.

19. The PWM signal generator of claim 18, further comprising:
a protector coupled to inhibit the PWM generation unit from generating a PWM signal to thereby turn off the transistor when one of a number of predetermined events occurs; and a controller coupled to periodically enable the PWM generation unit to generate a PWM signal after the PWM generation is inhibited from generation of a PWM signal in order to determine whether the one of a number of predetermined events still persists.

* * * * *